(12) United States Patent
Glavinic et al.

(10) Patent No.: US 8,177,010 B2
(45) Date of Patent: May 15, 2012

(54) DEVICE AND METHOD FOR CARRYING OUT WHEELBASE ADJUSTMENT FOR UTILITY VEHICLES

(75) Inventors: Andelko Glavinic, Hannover (DE); Tobias Lange, Bergheim (DE); Udo Ronnenberg, Wedemark (DE); Michael Schoppe, Hannover (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 309 days.

(21) Appl. No.: 12/586,629

(22) Filed: Sep. 23, 2009

(65) Prior Publication Data

US 2010/0072720 A1  Mar. 25, 2010

(30) Foreign Application Priority Data

Sep. 24, 2008  (DE) .......................... 10 2008 048 762
Mar. 4, 2009  (DE) .......................... 10 2009 011 606

(51) Int. Cl.
*B62D 61/12* (2006.01)

(52) U.S. Cl. ................ 180/209; 280/86.5; 280/124.157; 280/6.159

(58) Field of Classification Search .................. 280/5.5, 280/5.514, 6.157, 6.159, 86.5, 124.157; 180/24.02, 180/209

See application file for complete search history.

(56) References Cited

U.S. PATENT DOCUMENTS

| | | | |
|---|---|---|---|
| 5,472,227 A * | 12/1995 | Schonfeld et al. ............ 280/683 |
| 6,240,339 B1 * | 5/2001 | von Mayenburg et al. ....... 701/1 |
| 6,572,124 B2 * | 6/2003 | Mlsna et al. .................. 280/86.5 |
| 6,623,016 B2 * | 9/2003 | Sulzyc et al. ............... 280/5.514 |
| 6,970,772 B2 * | 11/2005 | Radtke et al. ...................... 701/1 |
| 7,222,867 B2 * | 5/2007 | Rotz et al. .................... 280/86.5 |
| 2002/0074746 A1 * | 6/2002 | Eberling et al. ............... 280/5.5 |
| 2005/0127628 A1 * | 6/2005 | Ramsey ....................... 280/86.5 |
| 2005/0137767 A1 * | 6/2005 | Goebels et al. ................. 701/38 |
| 2009/0079146 A1 * | 3/2009 | Stahl et al. ................. 280/6.159 |

FOREIGN PATENT DOCUMENTS

DE  10 2004 036 251 A1  2/2006

* cited by examiner

*Primary Examiner* — Joseph Rocca
(74) *Attorney, Agent, or Firm* — Krammer Levin Naftalis & Frankel LLP

(57) ABSTRACT

An apparatus and method for effecting wheelbase adjustment for utility vehicles having one or more axles with wheels, includes one or more adjustment mechanisms to which compressed air can be applied. The adjustment mechanism(s) adjust at least one of the axles in relation to the body of the vehicle. A pressure sensor measures the pressure of the compressed air in the adjustment mechanism(s) and generates corresponding pressure signals. A pulse-controlled valve or, alternatively, a spring-return valve, is employed to optionally feed the compressed air into the adjustment mechanism(s) and discharge the compressed air from the adjustment mechanism(s).

11 Claims, 4 Drawing Sheets

DEVICE AND METHOD FOR CARRYING OUT WHEELBASE ADJUSTMENT FOR UTILITY VEHICLES

FIELD OF THE INVENTION

The present invention generally relates to an apparatus and method for effecting wheelbase adjustment in a utility vehicle having one or more axles with wheels, one or more adjustment mechanisms to which compressed air can be applied for adjusting at least one of the axles in relation to the vehicle body, and a pressure sensor for measuring the pressure of the compressed air in the adjustment mechanism(s) and for generating corresponding signals.

BACKGROUND OF THE INVENTION

Wheelbase adjustment apparatuses and methods of the general type under consideration are known. Raising or lowering one or more vehicle axles changes the wheelbase of the vehicle and changes the loading of the other axles in a targeted fashion. As a result, it is possible, for example, to implement a starting aid by loading the wheels of the driven axles to a greater extent and, as a result, increasing the adhesion between these wheels and the underlying surface. Consequently, spinning of the driven wheels is made more difficult so that the starting process is made possible or made easier, particularly, on underlying surfaces that are covered with snow or ice. Furthermore, maneuvering the utility vehicle can also be made easier by raising one or more axles. The largest steering locks occur during maneuvering. As a result, large stresses occur between the axles, particularly, if two or more adjacent, non-steered axles are present. The reduction in the adhesion between the wheels of the raised axles and the underlying surface also reduces these stresses. Consequently, the wear on the wheels and the wheel bearings is decreased.

Conventional wheelbase adjustment apparatuses include one or more adjustment mechanisms, to which compressed air can be applied, arranged between the axles and the vehicle body of the utility vehicle. Applying compressed air to the adjustment mechanism(s) generates a pressure therein that correlates to the quantity of air that has flowed in. Conventionally, the quantity of compressed air that is applied to the adjustment mechanism(s) is controlled using, for example, a non-return overflow valve or a pressure limiting valve with afterfeed. These valves can be controlled manually by the driver or electronically. However, these valves tend not to maintain the set pressure value, particularly, if pressure peaks occur. Pressure peaks occur, for example, if an axle is to be lowered when the utility vehicle is under full load. If the pressure value is not maintained, this leads to a situation in which the desired relief of the loading on the other axles is no longer ensured, and the other axles are loaded to a greater degree than desired or even to a greater degree than is permitted. This causes increased wear on the wheel bearings on the other axles, and, in extreme cases, the bearings may fail. Furthermore, when these valves are used, a minimum pressure provided in the adjustment mechanism(s) may be undershot. The adjustment mechanism(s) at least partially perform the function of providing spring suspension to the utility vehicle. A minimum pressure is therefore necessary so that the adjustment mechanism(s) can generate their minimum necessary spring effect. If the minimum pressure is undershot, contact with the wheels without spring suspension—which contact occurs, for example, when traveling over potholes, railroad ties or bumps in the road—would be transmitted directly into the chassis arrangement which is consequently loaded to a high degree. As a result, the chassis arrangement wears more quickly or is damaged.

A method for maintaining minimum pressure in an air-spring bellows on a load bearing axle is described in DE 10 2004 036 251 A1. According to this reference, the stresses within the chassis arrangement are determined using a travel sensor, since the stresses bring about a change in the distance between the axles and the vehicle body. The adjustment mechanism(s) are actuated such that the stresses are reduced. The minimum pressure in the air-spring bellows is not determined directly. Instead, compressed air is always applied to the air-spring bellows such that a minimum distance between the axle and the vehicle body is not undershot. The problem of ensuring that the pressure value of the valves used is maintained is not solved by the method described in DE 10 2004 036 251 A1.

SUMMARY OF THE INVENTION

As used herein, the term "vehicle body" refers to all the units of a utility vehicle that are supported by the chassis arrangement of the vehicle. This may be bodywork, a load area or a cargo space. Also, as used herein, the term "wheelbase adjustment" refers to all functions that relate to the raising or lowering of one or more axles of the vehicle.

The present invention overcomes disadvantages associated with conventional vehicle wheelbase adjustment apparatuses and methods, and ensures that a minimum pressure is maintained in the adjustment mechanism(s). In accordance with embodiments of the present invention, a pulse-controlled valve is employed for optionally feeding compressed air into the adjustment mechanism(s) (which are, preferably, one or more air bellows) and discharging the compressed air therefrom. Pulse-controlled valves include two actuating elements by means of which the adjustment mechanism(s) are ventilated and vented and the axles are raised and lowered. For this purpose, an actuating element is activated in each case. If both actuating elements are activated simultaneously, a holding point is defined. In this way, it is possible to set and maintain any desired pressure in the adjustment mechanism(s), allowing the axle to be placed, in an infinitely adjustable fashion, into any position and held there.

Since pressure sensors are typically provided for determining the pressure in the air bellows in utility vehicles, no further mechanical components are necessary. With the inventive apparatus, the maintenance of the minimum pressure or the maintenance of a predefined pressure value in the adjustment mechanism(s) can be implemented without appreciable additional cost compared to conventional devices. Furthermore, the pressure sensor can be used to check directly whether or not the pressure in the adjustment mechanism(s) undershoots a predefined minimum value. It should be appreciated that, compared, for example, to the conventional method described in DE 10 2004 036 251 A1, it is not necessary to determine a chassis-dependent correlation between the distance of the axle from the vehicle body and the pressure prevailing in the adjustment mechanism(s).

In accordance with an alternative embodiment of the present invention, a spring-return valve can be employed for optionally feeding the compressed air into the adjustment mechanism(s) and discharging the compressed air therefrom. A further valve optionally shuts off the discharge of compressed air from the adjustment mechanism(s). As a spring-return valves can be switched only in binary fashion between a ventilating position and a venting position, the valve has an actuating element that, when activation occurs, moves a slide or a valve body counter to the force of a spring into a position in which the adjustment mechanism(s) is/are vented. If the actuating element is deactivated, the slide is reset into the home position again and the adjustment mechanism(s) is/are ventilated. Consequently, the axle can also be moved only between two end positions. This configuration of the spring-return valves ensures that if the on-board electronic system fails, the valves open automatically and ventilate the adjustment mechanism(s) so that the maximum pressure is applied to the adjustment mechanism(s). In this position, the adjustment mechanism(s) is/are also in the basic state, as a result of which the axle is in a completely lowered position in which it is loaded to the maximum extent. If the axle is then to be relieved of loading, the spring-return valve is opened. Without the further valve, the compressed air would escape completely from the air bellows, and the axle would be in the completely raised position. However, the further valve shuts off the discharge of the compressed air when there is a predefined pressure in the air bellows, so that the axle can also be moved into all desired intermediate stages in this configuration. At the same time it is ensured that the pressure value that is set is maintained even under heavy loading. In addition, the undershooting of a minimum pressure value is reliably prevented.

The apparatus according to embodiments of the present invention is controlled by a control device, preferably an EBS modulator for receiving the signals generated by the pressure sensor and for actuating the pulse-controlled valve, the spring-return valve and the further valve.

The apparatus according to an embodiment of the present invention can have application in three-axle semitrailers, which include three axles, two of which are embodied as main axles and one of which is embodied as a trailing axle. The term "main axle" is applied to an axle that is always in contact with the underlying surface, cannot be steered and is at a distance from the vehicle body that cannot be adjusted.

The apparatus according to an embodiment of the present invention can have application in a trailer of what are referred to as exceptionally long trucks (e.g., "EuroCombis" or "Gigaliners"), which include five axles, two of which are steerable and three of which are not steerable, with two of the three non-steerable axles being embodied as main axles and one being embodied as a trailing axle.

The apparatus according to an embodiment of the present invention can have application in towing vehicles that include three axles, one of which is steerable and at least one of which is driven, with one axle being non steerable and non-driven and being embodied as a trailing axle. The present invention is therefore not restricted to utility vehicles without their own drive, and the advantages of the present invention can be realized as beneficially in towing vehicles as in trailer vehicles.

The advantages described above for the embodiments of the inventive apparatus also apply to a utility vehicle equipped therewith. In this context, the utility vehicle can be a trailer or a towing vehicle, for example.

A method in accordance with embodiments of the present invention for effecting wheelbase adjustment for utility vehicles having a vehicle body and one or more axles with wheels, includes the steps of adjusting of one of the axles in relation to the vehicle body using one or more adjustment mechanisms to which compressed air can be applied, measuring the pressure of the compressed air in the adjustment mechanism(s) and generating corresponding signals using a pressure sensor, and optionally feeding the compressed air into the adjustment mechanism(s) and discharging the compressed air therefrom by means of a pulse-controlled valve or a spring-return valve. In the case of a spring-return valve, the method further includes the step of optionally shutting off the discharge of the compressed air from the adjustment mechanism(s) using a further valve.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
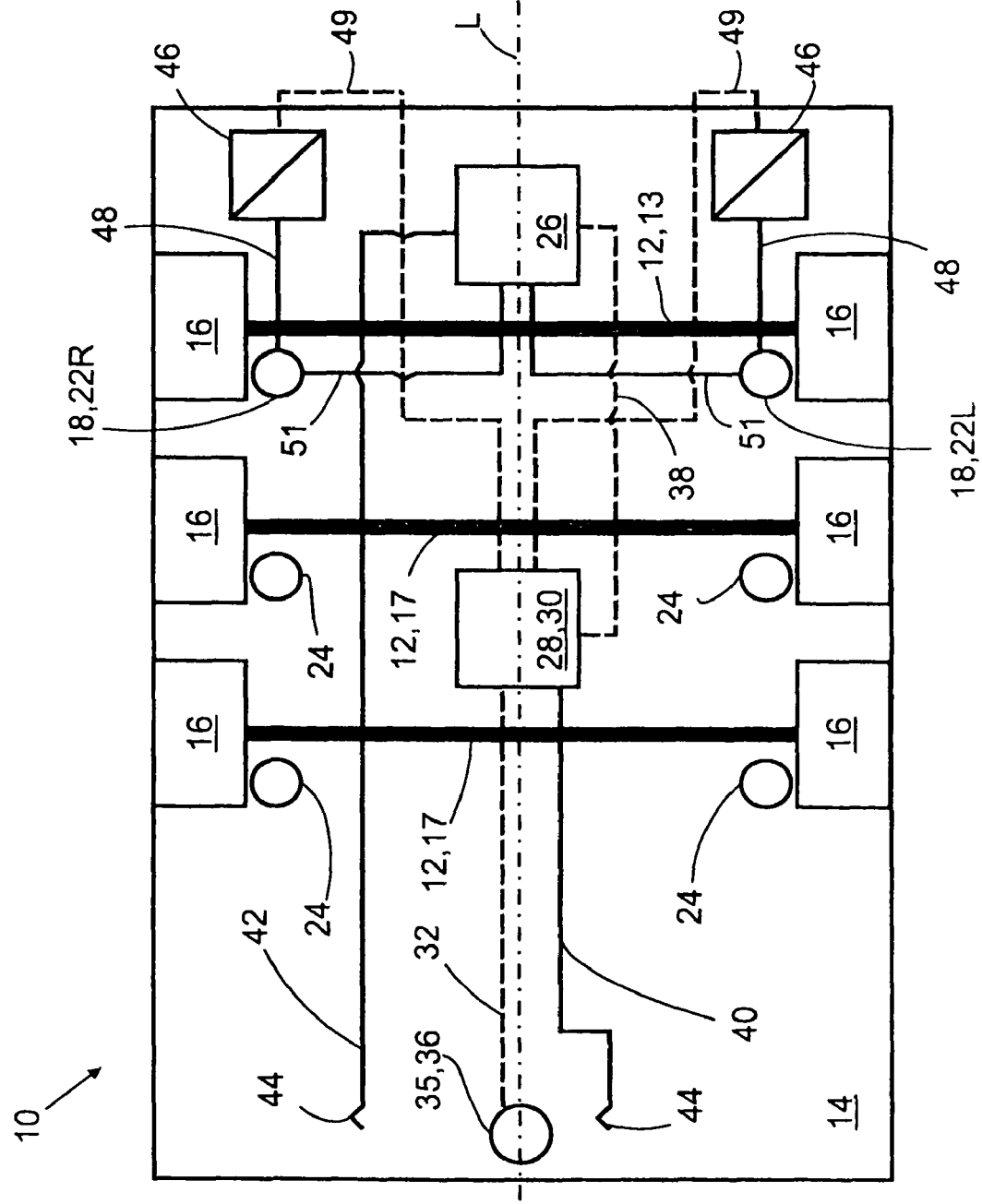
FIG. 1 shows a first exemplary embodiment of the apparatus according to the present invention.

In accordance with embodiments of the present invention, which, generally speaking, relates to an apparatus and method for effecting wheelbase adjustment in a utility vehicle having one or more axles with wheels, one or more adjustment mechanisms, to which compressed air can be applied for adjusting at least one vehicle axle in relation to the vehicle body, is/are provided. A pulse-controlled valve is employed for optionally feeding compressed air into the adjustment mechanism(s) and discharging the compressed air therefrom. The pulse-controlled valve includes two actuating elements by means of which the adjustment mechanism(s) are ventilated and vented and the axles are raised and lowered. For this purpose, an actuating element is activated in each case. If both actuating elements are activated simultaneously, a holding point is defined. In this way, it is possible to set and maintain any desired pressure in the adjustment mechanism(s), allowing the axle to be placed, in an infinitely adjustable fashion, into any position and held there.

Since pressure sensors are provided for determining the pressure in the air bellows in many utility vehicles, no further mechanical components are necessary. With the apparatus according to embodiments of the present invention, the maintenance of the minimum pressure or the maintenance of a predefined pressure value in the adjustment mechanism(s) can be implemented without appreciable additional cost compared to conventional devices. Furthermore, the pressure sensor can be used to check directly whether or not the pressure in the adjustment mechanism(s) undershoots a predefined minimum value.

The pressure sensor can output the signals relating to the pressure in any suitable form, for example as optical signals on a display device, so that the vehicle driver can see whether the pressure undershoots a certain minimum value. Furthermore, the signals can be output in electronic form.

Alternatively, in accordance with embodiments of the present invention, a spring-return valve can be employed for optionally feeding the compressed air into the adjustment mechanism(s) and discharging the compressed air therefrom. A further valve optionally shuts off the discharge of compressed air from the adjustment mechanism(s). Spring-return valves are simple in design and cost effective to acquire, and are also distinguished by a high degree of robustness and reliability. However, they can be switched only in binary fashion between a ventilating position and a venting position. For this purpose, the valve has an actuating element that, when activation occurs, moves a slide or a valve body counter to the force of a spring into a position in which the adjustment mechanism(s) is/are vented. If the actuating element is deactivated, the slide is reset into the home position and the adjustment mechanism(s) is/are ventilated. Consequently, the axle can also be moved only between two end positions. This configuration of the spring-return valves ensures that if the on-board electronic system fails, the valves open automatically and ventilate the adjustment mechanism(s) so that the maximum pressure is applied to the adjustment mechanism(s). In this position, the adjustment mechanism(s) is/are also in the basic state, as a result of which the axle is in a completely lowered position in which it is loaded to the maximum extent. If the axle is then to be relieved of loading, the spring-return valve is opened. Without the further valve, the compressed air would escape completely from the air bellows, and the axle would be in the completely raised position. However, the further valve shuts off the discharge of the compressed air when there is a predefined pressure in the air bellows, so that the axle can also be moved into all desired intermediate stages in this configuration. At the same time it is ensured that the pressure value that is set is maintained even under heavy loading. In addition, the undershooting of a minimum pressure value is reliably prevented.

The apparatus according to embodiments of the present invention is controlled by a control device, preferably an EBS modulator, for receiving the signals generated by the pressure sensor and for actuating the pulse-controlled valve, the spring-return valve and the further valve. In this case, the signals of the pressure sensor are output in electronic form. Control devices, particularly, EBS modulators, are ubiquitous in modern utility vehicles, and they convert control signals into corresponding pneumatic signals, for example for actuating pneumatically operated brakes. There is no appreciable additional technical expenditure necessary to expand the EBS modulator such that, when a selectable minimum pressure in the adjustment mechanism(s) is undershot, the EBS modulator actuates the valve such that compressed air flows into the adjustment mechanism(s) until the minimum pressure is reached again. The configuration of the EBS modulators can be adapted to the respective type of vehicle flexibly and without a large expenditure at the factory, by the servicing facilities or by the driver himself/herself, and, particularly, the value of the minimum pressure that is to be obtained in the adjustment mechanism(s) can be changed quickly. In addition, EBS modulators are configured such that all the acquired data and configuration changes can be stored and analyzed at any time. In this way, it is possible, for example, to determine the minimum pressure that is particularly suitable for protecting the wheel bearings, or whether there is a leak in the adjustment mechanism(s) and parts should be replaced. There is, therefore, no need to manually input the value for the minimum pressure (manually inputting this value is difficult to monitor in conventional systems). Actuating the pulse-controlled valve, the spring-return valve and the further valve by means of the EBS modulator does not present a difficulty either. For example, the two actuating elements of the pulse-controlled valve can be configured as magnets. If these magnets are energized simultaneously, any desired holding position can be adopted and the respective axle can be moved in an infinitely adjustable fashion into any position and held there. In this way, the pulse-controlled valve can be connected to the EBS modulator and be actuated by it in accordance with the measured pressure values in the adjustment mechanism(s). This also applies analogously to the further valve and to the spring-return valve.

The adjustment mechanism(s) is/are advantageously configured as air bellows. Air bellows are used widely in the construction of utility vehicles, are cost effective to acquire and are distinguished by a high degree of reliability. However, they tend to crumple when they are completely vented. In conjunction with the maintenance of minimum pressure according to embodiments of the present invention, the minimum pressure can be selected such that the air bellows are vented only to such an extent that they do not crumple. Consequently, the service life of the air bellows is prolonged.

The apparatus according to embodiments of the present invention can include three axles, two of which are embodied as main axles and one of which is embodied as a trailing axle. This is a characteristic configuration in the case of three-axle semitrailers. As noted above, the main axle is an axle that is always in contact with the underlying surface, cannot be steered and is at a distance from the vehicle body that cannot be adjusted. Main axles also have air bellows, but they are not used here to perform adjustment; rather, they are used for the purpose of providing spring suspension. Also as noted above, the trailing axle is an axle at a distance from the vehicle body that can be adjusted using the adjustment mechanism(s), for example, air bellows. The trailing axle is usually not loaded until a predefined critical axle load of the main axle or main axles is exceeded, and the trailing axle is relieved of loading again when the axle load of the main axle drops below a predefined value. This critical axle load is predefined by the pressure value in the air bellows of the trailing axle. However, due to the intrinsic weight of trailing axles, they are in contact with the underlying surface even when air bellows are completely vented since the trailing axles do not have any lift bellows such as is the case in lift axles. Lift bellows, which act in opposition to the air bellows via a lever system, can be used to raise lift axles to such an extent that they no longer have any contact with the underlying surface. Since lift axles can be raised to be decoupled from the underlying surface, in contrast to trailing axles, there is no damage to bearings or to the chassis arrangement, for example, when traveling over potholes.

If the trailing axle is raised, the other axles are correspondingly loaded to a greater extent. For safety reasons the EBS modulator can therefore be configured such that the trailing axle can be actuated only below a predefined speed, for example up to 30 km/h. A sudden load change while traveling due to inadvertent actuation of the trailing axle by the driver can therefore be avoided. Furthermore, the EBS modulator can also be configured such that the trailing axle is lowered automatically when the predefined speed is exceeded, provided that it is not already in the lowered state or is lowered further in order to keep the loading of the main axles low. This is appropriate if the utility vehicle is heavily laden.

The apparatus according to embodiments of the present invention can include five axles, two of which are steerable and three of which are not steerable, with two of the three non-steerable axles being embodied as main axles and one being embodied as a trailing axle. This is a characteristic configuration of a trailer of an exceptionally long truck (e.g., a EuroCombi or Gigaliner), by which many and large loads can be transported. In order to be able to distribute the large loads among the axles such that the axles themselves do not load the wheel bearings and the underlying surface excessively, five axles are preferably provided. However, during maneuvering or when traveling around tight bends, large stresses occur between the axles, particularly, between the two steerable axles but also between the three adjacent non-steerable axles. These stresses can be, at the least, significantly reduced in an easy manner using the present invention.

The apparatus according to embodiments of the present invention can include three axles, one of which is steerable and at least one of which is driven, with one axle being non steerable and non-driven and being embodied as a trailing axle. This configuration can be found in towing vehicles, and the present invention is therefore not restricted to utility vehicles without their own drive. It should be appreciated that the advantages of the present invention can be realized as beneficially in towing vehicles as in trailer vehicles.

Trailing axles are usually non steerable and non-driven, but, it should be understood that the application of the present invention is not restricted thereto. It is also conceivable to configure driven and/or steerable axles and lift axles according to the present invention.

The advantages described above for the inventive apparatus also apply to a utility vehicle equipped therewith. In this context, the utility vehicle can be a trailer or a towing vehicle, for example.

Referring now to the drawings, FIG. 1 depicts a first exemplary embodiment of the apparatus 10 according to the present invention. In this exemplary embodiment, apparatus 10 includes three axles 12, two of which are configured as main axles 17 and the third as a trailing axle 13. It should be understood, however, that the application of the present invention is not restricted to a specific number of axles. This exemplary embodiment is typical of a semitrailer 14 (see, e.g., FIG. 3). Each axle 12 is, respectively, assigned two wheels 16, and, in this context, one axle can also be assigned more wheels, such as is the case, for example, with twin tires.

Figure 3:
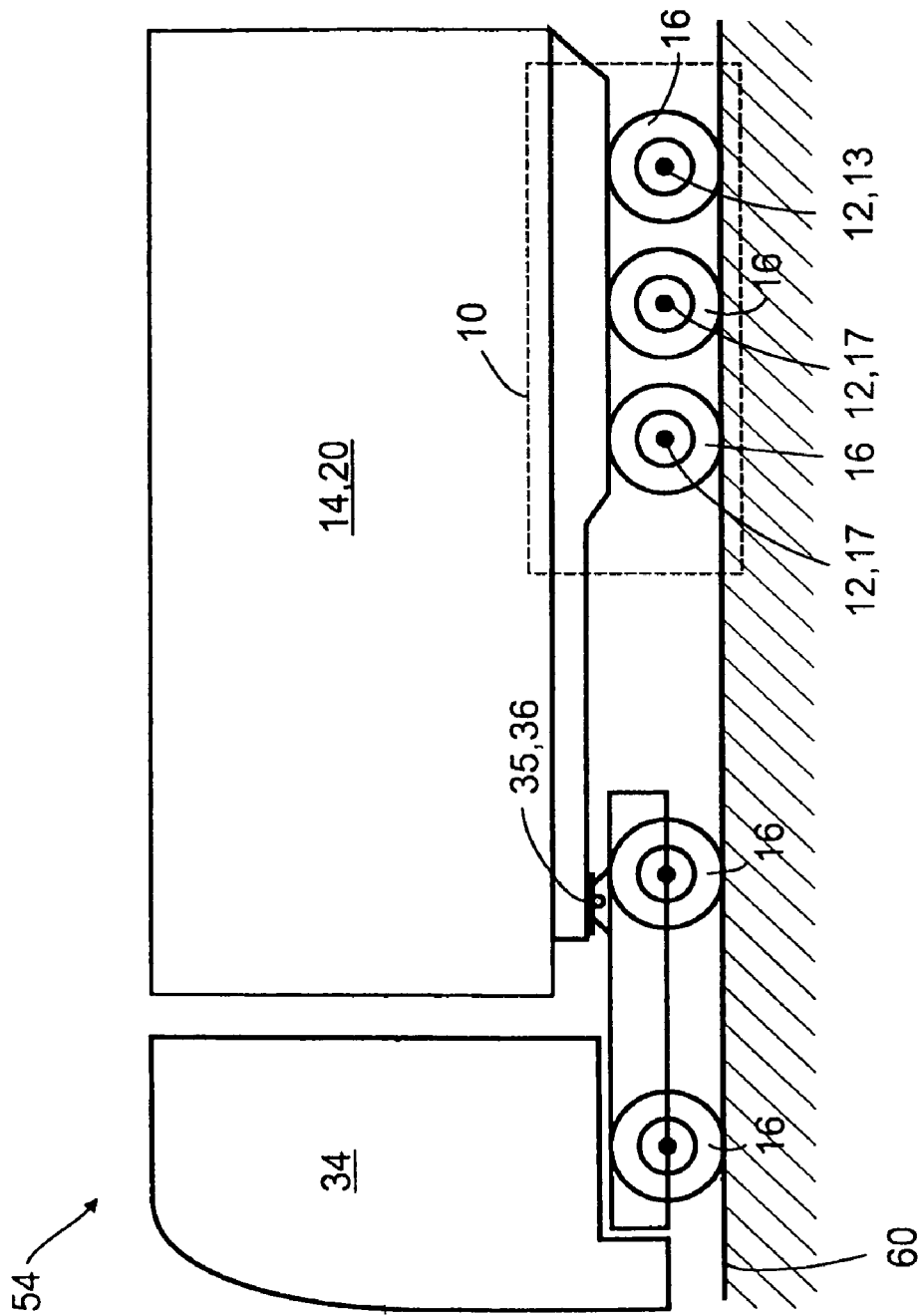
FIG. 3 shows a first utility vehicle combination comprising a towing vehicle and a semitrailer with a chassis arrangement in accordance with the present invention.
Figure 4:
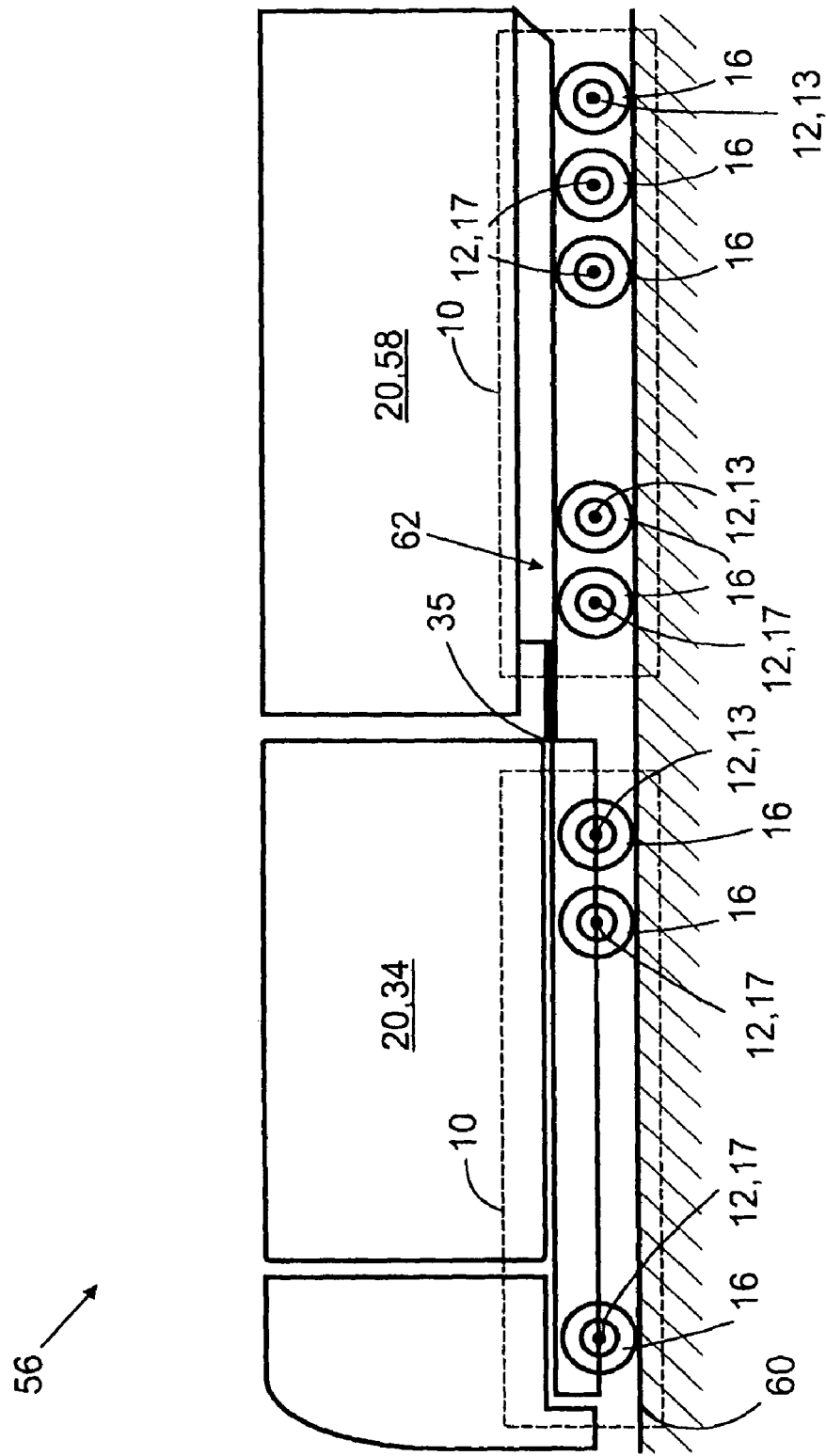
FIG. 4 shows a second utility vehicle combination comprising a towing vehicle and a drawbar trailer with a tandem drawbar with a chassis arrangement in accordance with the present invention.

Trailing axle 13 is assigned one or more adjustment mechanisms by which the axle can be adjusted in relation to a vehicle body 20 (see FIGS. 3 and 4). In the illustrated example, a pair of adjustment mechanisms 18 are embodied as air bellows 22 to which compressed air can be applied—the right-hand air bellows of trailing axle 13 is denoted by 22R and the left-hand one by 22L for the purposes of differentiation. The main axles 17 also have air bellows 24, but these do not act as adjustment mechanisms; rather, they serve exclusively to provide spring suspension to the semitrailer 14.

Apparatus 10 further includes a pulse-controlled valve 26 for optionally ventilating and venting air bellows 22. The term "pulse-controlled valve" is used in connection with the exemplary embodiment to refer to a 3/3 way valve which can assume the positions of ventilating, venting and maintaining. Pulse-controlled valve 26 is actuated by a control device 28 that can be embodied as an EBS modulator 30. EBS modulator 30 is connected via a first electrical line 32 to a towing vehicle 34 (see FIGS. 3 and 4), in order to be able to exchange data and commands with towing vehicle 34. In the illustrated example, the electrical connection between towing vehicle 34 and semitrailer 14 is made via a mechanical coupling 35 embodied as a bearing point 36 via which all the mechanical forces that occur between towing vehicle 34 and semitrailer 14 are transmitted. It is also possible to implement the electrical connection between towing vehicle 34 and semitrailer 14 by means of separate electrical plug-type connections.

The actuation of pulse-controlled valve 26 is implemented by means of a second electrical line 38. The compressed air is held in reserve by two compressed air stores located in towing vehicle 34, from which compressed air stores a first pneumatic line 40 leads into EBS modulator 30 and a second pneumatic line 42 leads into pulse-controlled valve 26. The pneumatic connection between towing vehicle 34 and semitrailer 14 is provided via pneumatic plug-type connections 44. A third pneumatic line 48 leads to air bellows 22 from pulse-controlled valve 26. In order to be able to determine the pressure in air bellows 22, the air bellows are each assigned a pressure sensor 46. Pressure sensor 46 is connected to air bellows 22 via a fourth pneumatic line 51, and it converts the measured pressure into corresponding electrical signals that are conducted to EBS modulator 30 via a third electrical line 49.

In the example depicted in FIG. 1, a separate pressure sensor 46 is provided for each air bellows 22. In addition, pulse-controlled valve 26 is configured such that it can ventilate and vent the left-hand and right-hand air bellows 22L and 22R separately. Alternatively, it is also possible to provide just one pressure sensor 46 and to configure pulse-controlled valve 26 such that the left-hand and right-hand air bellows 22L and 22R are ventilated and vented jointly. However, in such alternative configuration, it is not possible to change the inclination of the semitrailer 14 about a longitudinal axis L, for example, in the case of a load having a center of gravity that is not located on the longitudinal axis L, or during adaptation to a loading ramp the adjacent underlying surface of which has a lateral incline.

The operation of apparatus 10 according to embodiments of the present invention will be described using an example that assumes a basic state in which all the axles 12 are completely lowered, that is, all the air bellows 22 are completely ventilated. The driver of towing vehicle 34 (see FIG. 3) then wishes to perform a maneuvering operation, for which purpose he/she issues the command to completely raise trailing axle 13. This command passes via bearing point 36 and via first electrical line 32 to EBS modulator 30, which, in turn, actuates pulse-controlled valve 26 such that air bellows 22 of trailing axle 13 are vented and the trailing axle is raised. The venting process continues until a predefined minimum pressure is reached. Pressure sensor 46 then transmits a corresponding signal to EBS modulator 30, which, in turn, actuates pulse-controlled valve 26 such that venting is terminated. If the pressure were to drop below the minimum pressure, for example as a result of porosities in the air bellows 22, pressure sensor 46 transmits a corresponding signal to EBS modulator 30, which actuates pulse-controlled valve 26 such that the minimum pressure is reached again. Furthermore, it is also possible to configure EBS modulator 30 such that trailing axle 13 can be raised or lowered only below a certain speed, in order to avoid load changes while traveling. It is also possible to lower trailing axle 13 automatically if the axle load of main axles 17 exceeds a certain value. Pulse-controlled valve 26 can be used to apply any desired pressure to air bellows 22 in an infinitely adjustable fashion, in which case a minimum pressure that can be determined in the air bellows is not undershot.

Figure 2:
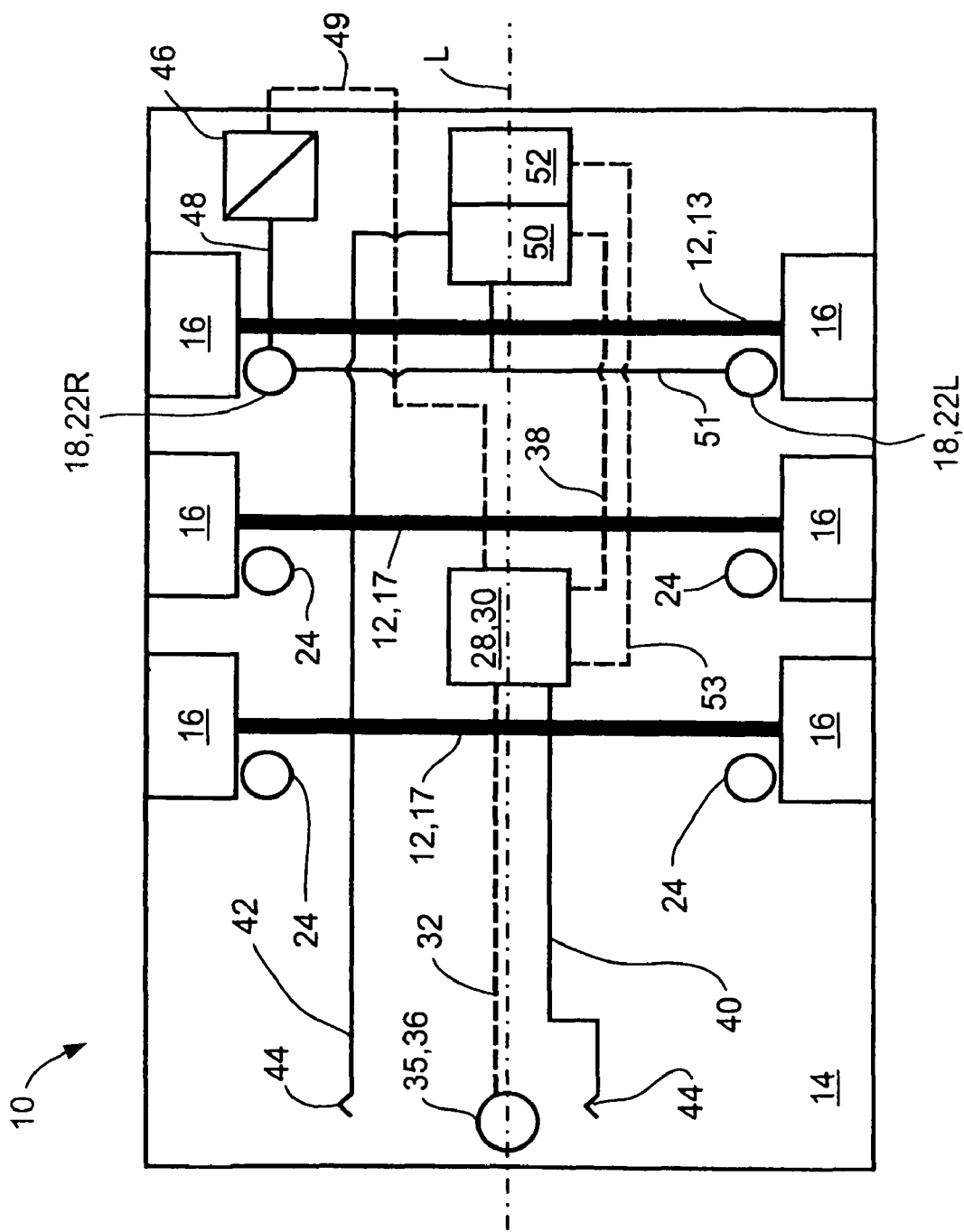
FIG. 2 shows a second exemplary embodiment of the apparatus according to the present invention.

FIG. 2 depicts a further exemplary embodiment of apparatus 10 according to the present invention. The basic vehicle body 20 of apparatus 10 corresponds to that of the exemplary embodiment depicted in FIG. 1. However, in the exemplary embodiment of FIG. 2, a pulse-controlled valve is not used; rather, a spring-return valve 50 and a further valve 52 are employed, with the spring-return valve 50 being connected via the second electrical line 38, and the further valve 52 being connected via a fourth electrical line 53, to EBS modulator 30. Spring-return valve 50 can be actuated by EBS modulator 30 only in a binary fashion—that is, it can either be opened or closed. A certain pressure cannot be applied between the maximum pressure predefined by the compressed air store and atmospheric pressure in air bellows 22 by using only spring-return valve 50. Consequently, here, trailing axle 13 could not be moved into and held in an intermediate position. In order, nevertheless, to permit trailing axle 13 to be adjusted in an infinitely variable fashion, the further valve 52 is used—valve 52 being located, as illustrated, directly at spring-return valve 50, or being connected as a separate unit via a pneumatic line to spring-return valve 50 (not illustrated). Further valve 52 is actuated by EBS modulator 30 such that, on the one hand, the desired pressure is present in air bellows 22 and, on the other hand, the desired minimum pressure is not undershot.

In FIG. 2, only air bellows 22R is connected to pressure sensor 46 via pneumatic line 48. Owing to the selected configuration of fourth pneumatic line 51, spring-return valve 50 and further valve 52 perform both the ventilation and venting of left-hand air bellows 22L as well as that of right-hand air bellows 22R. The same can also be achieved with a corresponding configuration of spring-return valve 50 using the two separate fourth pneumatic lines 51, in which case the routing of fourth lines 51 can correspond to that shown in FIG. 1. Owing to the selected configuration, the same pressure prevails both in the left-hand air bellows 22L and in the right-hand air bellows 22R. In this way, it is possible to dispense with a second pressure sensor 46 per axle; however, in this configuration, it is not possible to incline the semitrailer about the longitudinal axis L.

FIG. 3 illustrates a first utility vehicle combination 54 including a towing vehicle 34 and semitrailer 14 equipped with apparatus 10 according to an embodiment of the present invention. Semitrailer 14 is coupled via bearing point 36 to towing vehicle 34, and it includes two main axles 17 and a trailing axle 13.

FIG. 4 shows a second utility vehicle combination 56 including a towing vehicle 34 and a drawbar trailer 58 with a tandem drawbar 62 equipped with apparatus 10 according to an embodiment of the present invention. At the towing vehicle end of tandem drawbar 62, drawbar trailer 58 is connected to towing vehicle 34 via a mechanical coupling 35. In this example, both towing vehicle 34 and drawbar trailer 58 have apparatus 10. Towing vehicle 34 includes two main axles 17, one of which is steerable. One or both main axles 17 are driven. Furthermore, towing vehicle 34 has a trailing axle 13. Drawbar trailer 58 has a total of five axles 12, two of which are combined to form the tandem drawbar 62, and they, therefore, steer the trailer. One of these axles 12 is embodied as a trailing axle 13. Two of the other three axles 12 are embodied as main axles 17, and one is embodied as a trailing axle 13. The use of apparatus 10 ensures that when trailing axles 13 are vented, a certain minimum pressure in air bellows 22 is not undershot.

A method in accordance with embodiments of the present invention for effecting wheelbase adjustment for utility vehicles having a vehicle body and one or more axles with wheels, includes the steps of adjusting of one of the axles in relation to the vehicle body using one or more adjustment mechanisms to which compressed air can be applied, measuring the pressure of the compressed air in the adjustment mechanism(s) and generating corresponding signals using a pressure sensor, and optionally feeding the compressed air into the adjustment mechanism(s) and discharging the compressed air therefrom by means of a pulse-controlled valve or a spring-return valve. If a spring-return valve instead of a pulse-controlled valve is employed, the method further includes the step of optionally shutting off the discharge of the compressed air from the adjustment mechanism(s) using a further valve.

The above method steps are preferably carried out in the sequence specified. However, it should be understood that such steps are not required to be effected in the specified sequence.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense. For example, the individual elements of the subject apparatus could also be arranged in a different sequence from that illustrated. Furthermore, other means could be used to determine and maintain the minimum pressure in the air bellows. In particular, steerable and driven axles can also be configured according to the invention. Lift axles would also be conceivable with the device according to the invention.

It is also to be understood that the following claims are intended to cover all of the generic and specific features of the invention herein described and all statements of the scope of the invention which, as a matter of language, might be said to fall therebetween.

What is claimed is:

1. An apparatus for effecting wheelbase adjustment in a vehicle having at least one axle with wheels, said apparatus comprising at least one adjustment mechanism to which compressed air can be applied for adjusting at least one of said at least one axle in relation to a body of said vehicle, a pressure sensor operable to measure a pressure of compressed air in said at least one adjustment mechanism and to generate at least one corresponding pressure signal, and a pulse-controlled valve operable to feed said compressed air into said at least one adjustment mechanism and to discharge said compressed air from said at least one adjustment mechanism, said pulse-controlled valve comprising actuating elements, said at least one axle being infinitely adjustably moveable when said actuating elements are energized simultaneously.

2. The apparatus according to claim 1, further comprising a control device operable to receive said at least one pressure signal generated by said pressure sensor and to actuate said pulse-controlled valve.

3. The apparatus according to claim 2, wherein said control device is an electronic braking system modulator.

4. The apparatus according to claim 1, wherein said at least one adjustment mechanism is at least one air bellows.

5. The apparatus according to claim 1, wherein said vehicle has three axles, two of said axles being main axles and one of said axles being a trailing axle.

6. The apparatus according to claim 1, wherein said vehicle has five axles, two of said axles being steerable and three of said axles being non-steerable, and two of said non-steerable axles being main axles and one of said non-steerable axles being a trailing axle.

7. The apparatus according to claim 1, wherein said vehicle has three axles, one of said axles being steerable and at least one of said axles being driven, and one of said axles being non-steerable, non-driven and a trailing axle.

8. A vehicle comprising an apparatus for effecting wheelbase adjustment as claimed in claim 1.

9. The apparatus according to claim 1, wherein said at least one axle is holdable in a position when said actuating elements are energized simultaneously.

10. A method for effecting wheelbase adjustment in a vehicle having a vehicle body and at least one axle with wheels, the method comprising the steps of:
- adjusting one of said at least one axle in relation to said vehicle body using at least one adjustment mechanism to, which compressed air can be applied;
- measuring a pressure of said compressed air in said at least one adjustment mechanism and generating at least one corresponding pressure signal using a pressure sensor; and
- at least one of feeding said compressed air into said at least one adjustment mechanism and discharging said compressed air from said at least one adjustment mechanism using a pulse-controlled valve comprising actuating elements that when simultaneously energized allow said at least one axle to be infinitely adjustably moveable.

11. The method according to claim 10, wherein when said actuating elements are energized simultaneously, said at least one axle is holdable in a position.

* * * * *